Jan. 19, 1960 E. SIMON ET AL Re. 24,767

PACKAGE WITH CELLULAR PLASTIC PACKAGING MEANS

Original Filed Dec. 11, 1951 2 Sheets-Sheet 1

INVENTORS
ELI SIMON
FRANK W. THOMAS
BY George Sullivan
Agent

PACKAGE WITH CELLULAR PLASTIC PACKAGING MEANS

Original Filed Dec. 11, 1951 2 Sheets-Sheet 2

INVENTORS
ELI SIMON
FRANK W. THOMAS
BY George C. Sullivan
Agent

United States Patent Office

Re. 24,767
Reissued Jan. 19, 1960

24,767

PACKAGE WITH CELLULAR PLASTIC PACKAGING MEANS

Eli Simon, Los Angeles, Calif., and Frank W. Thomas, Fulton, Ga., assignors to Lockheed Aircraft Corporation, Burbank, Calif.

Original No. 2,780,350, dated February 5, 1957, Serial No. 261,054, December 11, 1951. Application for reissue January 10, 1958, Serial No. 709,724

7 Claims. (Cl. 206—46)

Matter enclosed in heavy brackets [ ] appears in the original patent but forms no part of this reissue specification; matter printed in italics indicates the additions made by reissue.

This invention relates to the art of packing or packaging articles, objects and materials of various kinds for transportation, preservation, storage, etc. and it is a general object of the invention to provide simple, practical and dependable means for packaging or packing articles and materials that are fragils, delicate and easily damaged.

There are many classes of objects and materials that require special packing and protection for the purpose of shipping, storing, or for merely preserving the same. These include fragile and perishable articles such as electrical, electronic, and X-ray equipment having thin, easily broken glass envelopes, shock sensitive material such as those containing fulminates, or the like, delicate optical instruments and components, medical and surgical equipment, materials and specimens, valuable and fragile antiques and archaeological objects, etc., vibration and shock sensitive mechanisms, and the like. The conventional procedures for packaging or packing such articles and materials comprise the construction of special boxes or crates, the use of soft yielding packing materials such as excelsior, shredded paper, etc. and are not only expensive and time consuming but also involve steps or acts such as nailing up the boxes that actually endanger the object or material being packed.

It is an object of the present invention to provide packing means and procedures that do not subject the article or material being packed to vibration shock or other potentially damaging treatment and do not even require inverting, tipping, or other changes in the attitude of the article or material.

Another object of the invention is to provide a packing or packaging means and procedure that provides uniform and entirely adequate thermal, shock, impact, vibration, inertia and fluid impervious insulation for the article or material. In practicing the invention the object or material is completely encased in a cellular or foamaceous sheath of selected thickness that is effective as a protection against shock, impact, vibration, inertia effects, etc. as well as being a good thermal insulating blanket and a fluid-tight or impervious shell to protect the object or material against deterioration by temperature changes or moisture.

Another object of the invention is to provide a packaging or packing means and procedure of the character mentioned wherein the enclosing sheath of cellular or foamaceous material is flexible, yielding and resilient to the desired or required degree to cradle or support the object in such a manner that it is well protected against heavy or severe impact as well as against low amplitude vibration, and the like.

Another object of the invention is to provide a packing means and procedure of this character that is adapted to protect the packed object or material for parachute drops or landings, for aeronautical and missile investigations and tests as well as for vessel to shore ocean landings where the package floats ashore. In the latter case, the cellular or foamaceous sheath is of low density and is buoyant to serve as a water impervious float or vessel to safely carry the object ashore.

Another object of the invention is to provide a packing or package of the character referred that incorporates an inner enclosing sheath of yielding, flexible and resilient cellular material cradling and supporting the packaged article and an outer encasing sheath of more rigid cellular or foamaceous material for increasing the overall strength of the package and for resisting heavy blows or impacts as well as localized blows to which the package may be subjected during transportation. The inner and outer sheaths of dissimilar physical characteristics may be directly bonded together or the inner and outer sheaths may directly adhere to a box or container in which the inner sheath is cast so that the two sheaths or layers, in effect, form a uniform supporting and protecting enclosure for the object or material and yet provide compliance layers of different natures.

A still further object of the invention is to provide a package of this character that may be readily deliberately opened without endangering or damaging the enclosed article or object. The invention provides several forms of packages or enclosures wherein means are incorporated in the cellular plastic sheath or layers to facilitate intentional breaking away of the same to gain access to the packed article or material. In one form of the invention a spiral of fabric, paper, wire-mesh, or the like, is embedded in the cellular plastic sheath to facilitate cutting, breaking, or tearing away of the cellular material, in other cases cords, wires, or other flexible elements are cast in the cellular layer or layers and lead to the object or contained material to direct the workman thereto as he opens the package, and in still other arrangements there are sheets of material capable of ready delamination, which sheets are cast in the cellular plastic layers to facilitate deliberate parting and detachment of the cellular layer or layers. These several instrumentalities may be employed to position and support the object or article at the time the cellular layer or layers are cast or poured around the same.

Other objectives and features of the invention will become apparent from the following detailed description of several typical forms of packages or packings of the invention and the methods of providing the same, throughout which description reference will be made to the accompanying drawings wherein.

Figure 1:
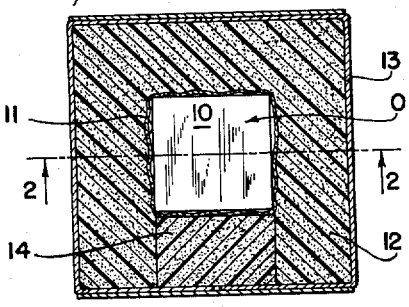
Figure 1 is a vertical sectional view of one form of package or packing arrangement of the invention.
Figure 2:
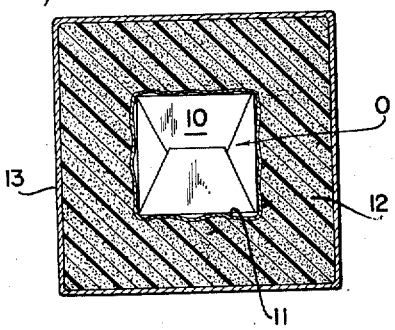
Figure 2 is a view taken as indicated by line 2—2 on Figure 1.

In Figures 1 and 2 we have shown the material or object to be packaged wrapped in a covering or wrapping 10 of paper, waxed paper, cloth, or the like. The wrapping 10 may be the initial original container or covering for the material or object, or may be applied just prior to carrying out the packaging procedure of the invention. It will be herein considered that the wrapping 10 forms a part of the article or object O to be packaged by the invention. In accordance with the invention, it is preferred, although not necessary, to enclose or wrap the material or object O in a wrapping, covering or bag 11 of waxed paper, or oiled paper, cellophane, or the like, to prevent the foamaceous material, to be subsequently described, from directly contacting and adhering to the object or its original wrapping 10. This covering or bag 11 preferably completely encloses the material or object O.

It is a feature of the invention that the article or object O, wrapped as above described, or otherwise prepared, is encased or enclosed in a shell or sheath 12 of foamaceous or cellular plastic. This protective sheath 12 is preferably poured, formed, or cast in place around the material or article being packaged or around its enclosing bag 11, and the wall thickness of the sheath 12 and the physical properties of the cellular plastic may be selected to offer or afford the required degree of protection for the material or object. The frangible nature of the object O and its intended mode of transportation, storage, etc. will thus determine the thickness, flexibility, etc. of the sheath 12. While the shell or sheath 12 may be formed of various types of selected foams or cellular plastics, we prefer to employ either an alkyd resin-poly isocyanate foamed plastic or a foamed phenolic resin plastic of the type that can be poured around or over the object O in the form of a reactive liquid mixture to thereupon react and foam up at atmospheric pressure and room temperature to constitute a shell or body of low density, relatively high strength, cellular material having substantially uniform closed cells throughout. These foamed plastics are such that their gas cells are discrete and non-communicating so that the material is substantially impervious to water, air and other fluids and the cellular plastics are light in weight and provide effective shock, impact and vibration insulation as well as a high degree of thermal insulation. They are also effective dielectrics and are opaque or can be made opaque by the inclusion of suitable pigments in their formulations.

Where an alkyd resin-polyisocyanate foamed plastic is to be employed in producing the protective sheath 12, the reactant mixture may be prepared from an alkyd resin having an acid number of from 5 to 80, a water content of from 0.1% to 2.5% by weight and wherein the ratio range of the hydroxyl groups to the carboxyl groups in the alkyd resin reactants is from

3(OH):1(COOH)

to 4(OH):5(COOH). Typical exmples of the alkyd resins that may be employed in the reactant mixture are:

FORMULA A

| | Mols |
|---|---|
| Glycerol | 4 |
| Adipic acid | 2.5 |
| Phthalic anhydride | 0.5 |

FORMULA B

| | |
|---|---|
| Glycerol | 2 |
| 1,4 butylene glycol | 1 |
| Adipic acid | 2 |

FORMULA C

| | |
|---|---|
| Tri-methylol propane | 4 |
| Adipic acid | 2.5 |
| Phthalic anhydride | 0.5 |

FORMULA D

| | |
|---|---|
| Trimethylol propane | 4 |
| Adipic acid | 1 |
| Phthalic anhydride | ½ |
| Dimer acids | ½ |

FORMULA E

| | |
|---|---|
| Trimethylol propane | 4 |
| Adipic acid | 2½ |
| Ricinoleic acid | 1 |

The dimer acids of Formula D are dimeric polymers of unsaturated fatty acids such as dimerized linoleic or linolenic acids and may be prepared by heating the methyl esters of polyunsaturated acids such as linoleic or linolenic acids at high temperatures.

The polyisocyanate employed in the reactant mixture is preferably meta-toluene diisocyanate and in preparing the mixture from 35 to 150 parts by weight of the meta-toluene diisocyanate are used with each 100 parts by weight of the alkyd resin, depending upon the water content of the resin, the acid number of the resin, and other factors.

The incorporation of a relatively small amount of one or more high molecular weight thermoplastic polymeric resin additives soluble in the meta-toluene diisocyanate will produce a cellular plastic of superior physical properties. The resin additive may be ethyl cellulose, polymeric chlorinated natural rubber, benzyl cellulose, natural rubber, polyvinyl chloride, or the like. From 0.03 gram to 15 grams of the ethyl cellulose or other high molecular weight thermoplastic resin may be used with each 100 grams of the meta-toluene diisocyanate.

The following are typical formulations for the preparation of the reactant alkyd resin-meta-toluene diisocyanate mixtures to be employed in producing the shell or sheath 12 of the package:

Example 1

| | Grams |
|---|---|
| Alkyd resin of Formula C, having an acid number of 20 and a water content of from 0.65% to 2.0% by weight | 60 |
| Meta-toluene diisocyanate containing from 2 to 6 grams ethyl cellulose of from 50 to 100 centipoises viscosity and having an ethoxyl content of from 45% to 49.5% per 100 grams of the meta-toluene diisocyanate | 40 |

Example 2

| | Grams |
|---|---|
| Alkyd resin of Formula A, having an acid number of 20 and a water content of from 0.5% to 1.5% by weight | 60 |
| Meta-toluene diisocyanate | 40 |
| Zinc stearate | ¼–3 |
| Aluminum leafing powder | ¼–3 |

Example 3

| | Grams |
|---|---|
| Alkyd resin of Formula D, having an acid number of from 15 to 35 and a water content of from 0.75% to 2.0% | 60 |
| Meta-toluene diisocyanate | 30–50 |

Example 4

| | Grams |
|---|---|
| Alkyd resin of Formula C, having an acid number of 20 and a water content of from 0.65% to 2.0% by weight | 60 |
| Meta-toluene diisocyanate containing from 2 to 6 grams ethyl cellulose of from 50 to 100 centipoises viscosity and having an ethoxyl content of from 45% to 49.5% per 100 grams of the metatoluene diisocyanate | 40 |
| Diallyl phenyl phosphonate | from 5 to 15 |
| Benzoyl peroxide | from .001 to 1 |

The viscosity of the ethyl cellulose in the above formulations is determined on the basis of a 5% by weight solution in a 60:40 toluene-ethanol solvent at 25° C. The zinc stearate and the metal leafing powders included in certain of the above formulations serve as foaming agents and foam stabilizing agents to improve the uniformity of the cellular plastic.

The cellular plastics above described are relatively unyielding and while they are effective in absorbing energy and, therefore, are capable of protecting the packaged material or object against shock, impact, and vibration, there are situations or types of packages where it is desirable to employ a cellular plastic that is more yielding and resilient to offer better protection. We have found that alkyd resin-polyisocyanate plastic foams having varying degrees of flexibility and resiliency may be produced by incorporating selected polyglycols in the reactant alkyd resin-isocyanate mixtures. These polyglycols not only serve as reactive plasticizers to make the alkyd resin-diisocyanate reaction products flexible, resilient and "rubbery," but also act to slow down the reaction and thus prevent the development of excessive exothermic heat. The latter action or function of the polyglycol additives facilitates the pouring or forming of large bodies or masses of the cellular plastic without the development of large voids or cracks that might otherwise appear. These polyglycols have molecular weights of from 100 to 5,000 and may be represented by the formula: $H—(OR)_nOH$, where R=intervening linkages and where n may vary from 2 to 40. Substituted or unsubstituted bis alkyl or aryl carbonates and the aryl glycol carbonates being represented by the formula:

$$\left[R_1(C_6H_4)—C\overset{O}{\diagup\!\!\!\diagdown}—O—R_2OH\right]R_1(C_6H_4)—\overset{O}{\overset{\|}{C}}—O—R_2OH$$

where $R_1$ may be phenyl or cresyl or napthyl or acenapthyl (substituted or unsubstituted by amine halogen or alcohol), and $R_2$ may be alkyl, may also be used. The alkyl glycols may be represented by the formula $[(OH)\ (CH2)_n(OH)]\ (OH)\ (CH_2)_n(OH)$ where n is from 2 to 10. The polyalkylene glycols and glycol carbonates may be used in the proportion of from 2 to 30 parts by weight for each 30 parts of the alkyd resin. The glycols are added to the alkyd resin just prior to mixing the alkyd resin and the meta-toluene diisocyanate.

The following are typical formulations for preparing the poured-in-place flexible and resilient cellular plastics:

Example 5

| | Grams |
|---|---|
| Alkyd resin of Formula C | 30 |
| Meta-toluene diisocyanate containing from 2 to 6 grams ethyl cellulose of from 50 to 100 centipoises viscosity and having an ethoxyl content of from 45% to 49.5% per 100 grams of the meta-toluene diisocyanate | 15 |
| Polyethylene glycol having a molecular weight of 1,000 | 14 |

Example 6

| | Grams |
|---|---|
| Alkyd resin of Formula C | 30 |
| Meta-toluene diisocyanate containing from 2 to 6 grams ethyl cellulose of from 50 to 100 centipoises viscosity and having an ethoxyl content of from 45% to 49.5% per 100 grams of the meta-toluene diisocyanate | 40 |
| Diethylene glycol bis cresyl carbonate | 2 |

Example 7

| | Grams |
|---|---|
| Alkyd resin of Formula C | 30 |
| Meta-toluene diisocyanate containing 2 grams ethyl cellulose of from 50 to 100 centipoises viscosity and having an ethoxyl content of from 45% to 49.5% per 100 grams of the meta-toluene diisocyanate | 40 |
| Polyethylene glycol (400 mol weight | 25 |

The quantity of the polyglycol employed in the alkyd resin-meta-toluene diisocyanate reactant mixture determines the flexibility and resiliency of the cellular or foamed plastic. For example, where 20 parts by weight of the glycol is used for 30 parts by weight of the alkyd resin, the cellular or foamaceous plastic product is very soft and flexible, where 15 parts by weight of the glycol is used for each 30 parts by weight of the alkyd resin the resultant cellular plastic is flexible and quite resilient, where 10 parts by weight of the polyglycol is used for each 30 parts by weight of the alkyd resin the cellular plastic is yielding and flexible but has a slow return value after compression and where 5 parts by weight of the polyglycol is employed for each 30 parts by weight of the alkyd resin the resultant cellular plastic is semi-rigid, deformable and very slow to return after being compressed. From this it will be seen that the flexibility, yieldability and resiliency of the cellular plastic shell or sheath 12 may be adjusted or provided to best package and protect the particular material or object O that is to be shipped or stored.

The invention contemplates the use of other cellular plastics that are capable of being cast or foamed in situ, that is poured about or on the object O in a liquid or semi-liquid state and then allowed or caused to foam up and encase the object at atmospheric pressure and room temperature. The above described alkyd resin-polyisocyanate reactant mixtures are of the class that may be employed in this manner and it is contemplated that other foaming plastic mixtures or materials may be used in a like manner. For example, unsaturated polyester foamaceous resins may be used to form the cellular plastic sheath 12. Cellular phenolic resins may be employed as the protective shell or sheath 12. Our copending application, Serial No. 231,673, filed June 14, 1951, entitled Cellular Phenolic Resin Materials, describes several formulations or mixtures that may be poured around or over the object O in the form of a liquid to foam up at atmospheric pressure and room temperature to constitute a relatively low density, impact resistant and shock absorbing cellular plastic sheath 12.

The following are typical formulations for preparing the cellular phenolic plastic material:

Example 8

| | Percent, by weight |
|---|---|
| Phenolic resin | 95 |
| Aluminum leafing powder, 400 mesh | 0.1 |
| Catalyst | 9.9 |

Example 9

| | Percent, by weight |
|---|---|
| Phenolic resin | 90 |
| Aluminum leafing powder, 400 mesh | 2 |
| Catalyst | 8 |

The phenolic resin may be prepared from 1 mol phenol, from 1 to 2.5% mols formaldehyde and from 0.003 to 0.020 mol barium hydroxide $8H_2O$. The catalyst contains 20% by weight benzene sulfonic acid, 45% by weight orthophosphoric acid (an 85% by weight concentration in an aqueous solution) and 35% by weight water.

A common and important characteristic of the various types of classes of cellular or foamaceous plastics employed in the packages and procedures of the invention is the fact that they are prepared as liquid or semi-liquid reactant mixtures and are adapted to be poured over or around the object O or otherwise introduced at the object to foam up and rise at atmospheric pressures and room temperatures to form a relatively light-weight cellular body or mass enclosing the object O and having substantially uniform cellular structure throughout, the individual cells of the material being closed and the material being impervious to fluids while having a high energy absorbing value. The cellular material adheres to practically all solids with which it comes into contact during its foaming or reacting phase and after it has set and hardened it may be machined or cut by appropriate tools to conform to the desired package shape, size, etc.

In order to facilitate the production of a shell or sheath 12 of the desired or required thickness, the material or object O may be placed within a container 13. This box or container 13 may be of paper, cardboard, wood, metal, or the like, to constitute a part of the final package, in which case the cellular material of the sheath 12 is allowed to directly adhere to its inner surfaces. On the other hand, the container 13 may be in the nature of a mold, lined with paper, cellophane, fabric, or the like, or its inner surfaces may be covered with oil, grease, etc. to prevent the direct adherence of the cellular plastic material 12 to the walls of the mold so that the package may be withdrawn from the mold upon hardness of the cellular plastic. In order to support the object O clear of all the walls of the container 13, we have shown in Figure 1, a pre-formed block 14 of cellular material, such as above described, arranged on the bottom wall of the container 13 and supporting the object O therefrom to occupy a substantially central position in the box. When the reactant mixture is introduced into the container 13, it surrounds and adheres to not only the object O but also the block 14 so that the block 14, which may be formed of the same cellular material, in effect constitutes an integral part of the cellular plastic sheath 12. In this way the material or object O is completely encased or enclosed in the energy absorbing cellular sheath. Where the object O is provided with the above described covering 11, the cellular material of course need not directly adhere to or engage the object O but adheres to the covering 11 which may protect the object against any harmful effects at contact by the cellular plastic.

It will be observed that the object O is entirely enclosed in the energy absorbing and shock and impact resistant cellular plastic sheath 12 to be adequately protected. The cellular material of the sheath 12 may be composed of a selected cellular plastic having the desired degree of resiliency, flexibility, etc. It is to be particularly noted that the sheath 12 is formed by merely pouring or introducing a liquid reactant mixture in the box or mold 13 to foam up around the object O to enclose or encase the same. Any excessive cellular plastic that may extend above the top of the box 13 may be cut or machined off to the desired level.

Figure 3:
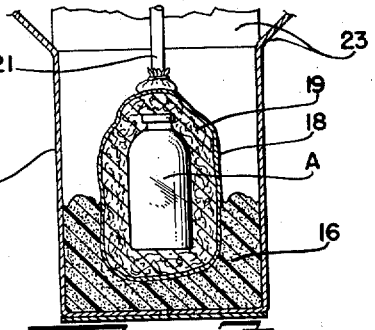
Figure 3 is a vertical sectional view illustrating the manner of casting or forming the inner sheath around the object or material being packaged.
Figure 4:
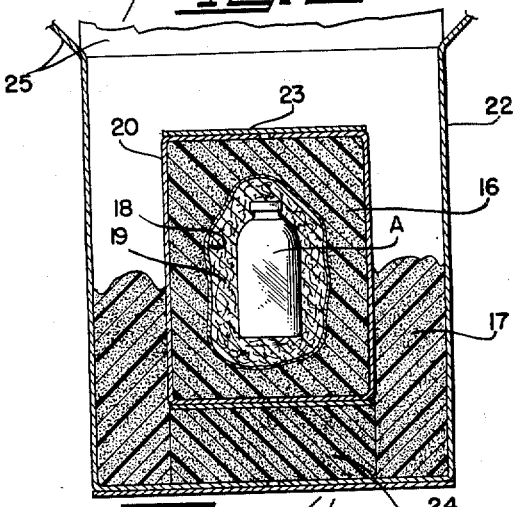
Figure 4 is a vertical detailed sectional view showing the manner of pouring or forming the outer sheath around the inner container and sheath.

Figures 3 and 4 illustrate a packaging method and package of the invention characterized by an inner protective sheath 16 and an outer protective sheath or shell 17. In this particular application of the invention the object A may be in the nature of a bottle, or the like, containing material that must be protected against vibration and shock, such as a fulminate. This object A is shown housed in a bag 18 of paper, fabric, or like material, with a mass 19 of soft yielding material within the bag to cradle the object. The mass 19 may be shredded paper, ground sponge rubber, cotton linters, excelsior, rags, or the like, and serves as an immediate protective layer around the object A. The above mentioned shell or sheath 16 is of cellular plastic material and preferably completely encloses the bag 18, as shown in Figure 4. This sheath 16 may be made or provided by pouring or introducing a liquid reactant mixture, such as above described, into a paper or cardboard container 20, or the like, to foam up around the bag 19 which is suitably positioned in the container. It may be preferred to employ the alkyd resin-polyglycol-metal-toluene diisocyanate type of cellular plastic reactant mixture described above for making the sheath 16 so that the bag 19 and its bottle or object A are encased in a yielding, flexible, and resilient mass or sheath 16 of cellular plastic. During the reaction and rising of the cellular material constituting the sheath 16 around the bag 19, one or more rods 21 may be used to hold the bag centralized in the box 20 so that it does not "float" or rise with the plastic mass. These rods 21 may be manipulated by the workmen to hold the bag 19 in the desired final position within the outer box 20. The cellular plastic sheath 16 may be poured or formed in a single continuous and uninterrupted operation, in which case the rod or rods 21 are employed to locate the bag 19, as just described. However, if desired, a sufficient quantity of the liquid reactant mixture may be introduced into the box 20 to rise up and constitute about one-half of the sheath 16 with the cellular plastic being permitted to set or partially harden to hold the bag 18 in place, whereupon the remainder of the reactant mixture may be introduced into the box 20 to rise up around the upper portion of the bag 19 and complete the sheath 16. If necessary, excessive cellular plastic that rises above the top of the box 20 may be cut or machined off to the desired level.

Following the making of the inner sheath 16, the box 20 is positioned within an outer container or box 22 of cardboard, paper, wood, metal, or the like. Where the top of the inner box 18 has flaps 23, these are closed or folded down, as illustrated in Figure 4. The box 20 may be positioned in the outer box 22 in any appropriate manner, for example, it may be placed on a block 24 of cellular plastic material arranged on the bottom of the outer container 22. With the inner box 20 in place, the reactant liquid or semi-liquid mixture of any of the classes above described, is poured or introduced into the box 22 and reacts to foam up around and over the box 20. When this cellular mass sets, it constitutes a wall or shell of cellular plastic material completely encasing the inner box 20 and any excess cellular material that has risen above the top of the outer box 22 may be cut off so that the flaps 25 of the outer box may be closed.

It may usually be preferred to form the two cellular plastic sheaths 16 and 17 of cellular plastic materials having dissimilar physical characteristics. For example, where the inner sheath 16 is of the alkyd resin-polyglycol-meta-toluene diisocyanate type cellular plastic, the outer sheath 17 may be of the more rigid phenolic foam or cellular plastic above described. This phenolic resin type cellular plastic, in addition to being more rigid and unyielding than the alkyd resin-polyglycol-diisocyanate type of foamed plastic, is considerably less expensive.

Figure 5:
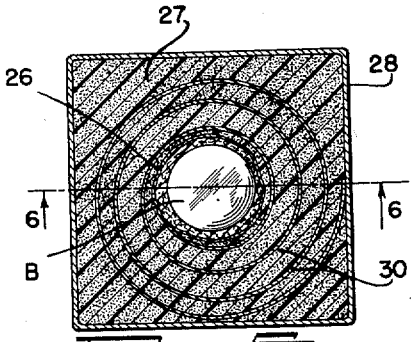
Figure 5 is a view similar to Figure 2 illustrating another form of the invention incorporating means for facilitating the removal of the protective shell or sheath of cellular material.
Figure 6:
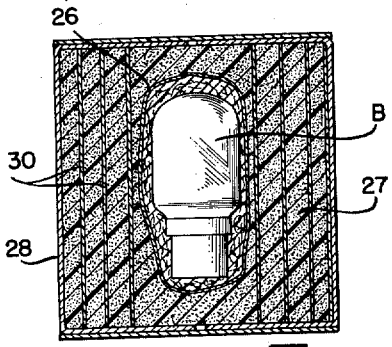
Figure 6 is a view taken as indicated by line 6—6 on Figure 5.

Figures 5 and 6 illustrate a type of container or package of the invention characterized by means for facilitating the removal of the plastic sheath when opening the package and for facilitating location of the enclosed object as the plastic sheath is cut away or removed. In these figures the object B is within a wrapping, covering, or bag 26, which, in turn, contains a soft yielding material such as shredded paper, cottonlinters, cloth, or the like, for engaging around the object and the bag 26 is in turn completely encased in a body or sheath 27 of cellular plastic. This sheath 27 may be formed from any of the above described types of cellular or foamaceous plastics and may be provided or cast around the bag or object in the same manner as the sheaths 12 and 16, described above. The package may or may not have a wall or box 28 around the sheath 27 and if desired may be provided with an outer sheath such as the cellular plastic sheath 17 of Figures 3 and 4. The means for facilitating cutting, breaking, or tearing away of the cellular material of the sheath 27 includes a helical or spiral sheet or layer 30 in the cellular plastic. This layer 30 has one end or edge at the object or bag 26 and spirals outwardly therefrom to the external surface of the sheath 27. The spiral layer 30 may be cloth, paper, sheet-metal, cardboard, or the like, and may or may not be perforated. As shown in the drawings, the convolutions of the spiral layer 30 are vertical and extend between the top and bottom of the box 28 so that when the reactant plastic mixture is introduced to form the sheath 27, it may be poured between the convolutions and around the outer convolution to rise or foam up in relatively thin sections which is a most effective manner of producing cellular or foamaceous plastic bodies of this nature. The cellular plastic adheres to both surfaces of the sheet or layer 30 so that the sheath 27 is, in effect, a one-piece integral mass encasing the object B and embedding the spiral layer 30. The object B and bag 26 may be positioned in the box 28 for the pouring of the sheath 27 in any selected manner. For example, where practical, the bag 26 may be positioned by the sheet or layer 30.

In opening the package of Figures 5 and 6 to gain access to the object B, the box or carton 28, if employed, is first removed and the outer edge of the layer 30 is located at the side surface of the sheath 27. The cellular plastic is then cut, broken, or pried free at the layer 30, employing appropriate hand tools when required, and the layer 30 may be pulled outwardly to assist in breaking or tearing loose the cellular plastic. Where the layer 30 is formed of a material such as cardboard, thick paper, or the like, that is capable of being delaminated, it may be manually and progressively delaminated as the cellular plastic of the sheath 27 is cut or broken free to assist in detaching the cellular material in pieces or sections. By advancing along the spiral layer 30, as the cellular plastic is cut or broken loose, the workman is automatically directed to the bag 26 or object B with little or no difficulty.

Figure 7:
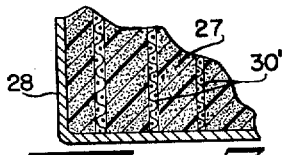
Figure 7 is an enlarged fragmentary sectional view illustrating a variation or modification of the structure illustrated in Figures 5 and 6.

Figure 7 illustrates a variation of the structure shown in Figures 5 and 6. In this type of package the helical or spiral layer 30' is constructed of wire netting or wire cloth to have considerable tensile strength. When the cellular plastic of the sheath 27 is to be removed to gain access to the object B, the workman may pull on the wire layer 30' with considerable force to facilitate the breaking or tearing free of the cellular plastic. The wire netting of course is perforate so that the cellular plastic embeds the individual wires which serve to cut through the cellular plastic as the wire is drawn or pulled outwardly.

Figure 8:
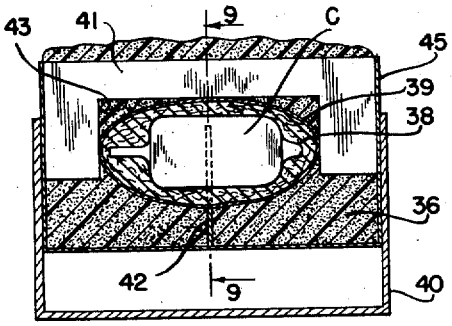
Figure 8 is a vertical sectional view of the inner component or assembly of another form of the invention being withdrawn from its mold.
Figure 10:
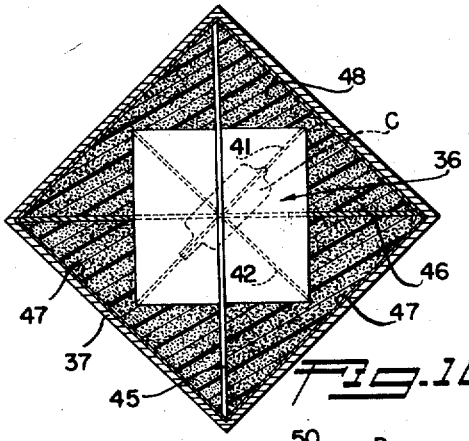
Figure 10 is a horizontal or transverse sectional view of the complete packaging arrangement of Figures 8 and 9 showing the inner assembly or component encased in its outer protective sheath.
Figure 9:
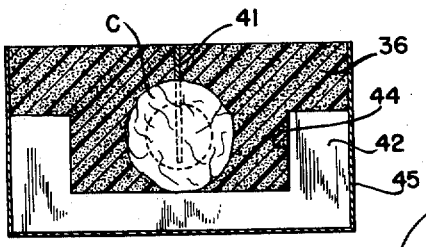
Figure 9 is a vertical sectional view of this inner component being a view taken as indicated by line 9—9 on Figure 8.

Figures 8, 9 and 10 illustrate a packaging procedure and package of the invention embodying effective means for positioning the object C in the mold or inner box 40 and for positioning the inner cellular plastic shell or sheath 36 in the outer mold or box 37. We have shown the object C packed in a mass 38 of soft material, such as shredded paper, ground foamed rubber, cloth, cotton linters, or the like, with the mass 38 contained in a wrapping or bag 39 of waxed paper, cloth, or the like. The inner shell or sheath 36 of foamed or cellular plastic may be formed or cast in the mold 40 to be removed therefrom when set and hard. The sheath 36 may be of any selected foamaceous plastic, for example it may be formed of the alkyd resin-polyglycol-meta-toluene diisocyanate type of foam, above described. The means for supporting or positioning the object C and its bag 39 in the mold 40 comprises two members or sheets 41 and 42 of cardboard, or similar material, arranged at right angles to one another. The sheets 41 and 42 are rectangular and vertically arranged. The sheet 41 has a notch 43 in its lower edge for receiving the bag 39 and the sheet 42 has a notch 44 in its upper edge for receiving the bag. Prior to pouring the reactant mixture into the mold 40, its inner wall or surface is provided with a parting material or compound to prevent adherence of the cellular plastic or the surfaces of the mold are lined with waxed paper, cellophane, or the like, designated at 45 in the drawings. The bag 39 is then assembled between the crossed sheets 41 and 42 and the assembly is introduced into the lined mold 40. The sheets 41 and 42 serve to hold the object C and its bag 39 substantially centralized in the mold 40. When the reactant liquid mixture is introduced into the mold 40 it foams up to encase the sheets 41 and 42 and the bag 39 with the object C therein. Any excess cellular plastic that may rise above the top of the mold 40 may be cut off or otherwise removed.

The next step in the packaging procedure is to assemble the inner cellular plastic sheath 36 in recesses or notches of two crossed sheets 45 and 46 of cardboard, or the like, and to arrange this assembly in the mold 37, the sheets 45 and 46 serving to hold the inner plastic sheath 36 centrally located in the outer mold. The crossed notched sheets 45 and 46 are similar in shape to the sheets 41 and 42. The outer mold 37 may be lined with waxed paper, cellophane, or the like, 47, or may be provided with a suitable parting compound or material to prevent adherence of the reactant plastic material thereto. As shown in Figure 10, the crossed sheets 45 and 46 for supporting the inner plastic shell or sheath 36 in the mold 37 may be arranged diagonally to have their edges engaged in the corner of the outer mold 37. With the assembly of the sheets 45 and 46 and the sheath 36 properly positioned in the mold 37, the reactant cellular plastic mixture is introduced into the mold to react therein and foam up around the inner sheath 36. This provides the outer protective impact and shock absorbing shell or sheath 48. The outer shell 48 may be of any selected cellular plastic, for example it may be either the alkyd resin-diisocyanate type or the phenolic type foamed plastic. The sheets 41 and 42 and 45 and 46 serve not only to position the bag 39 and sheath 36, as above described, but may also constitute means for facilitating location of and access to the bag and object C when the package is being opened.

Figure 11:
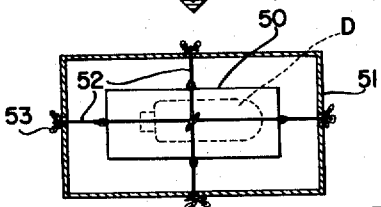
Figure 11 is a horizontal sectional view illustrating another manner of positioning and supporting the packaged object within an intermediate container.
Figure 12:
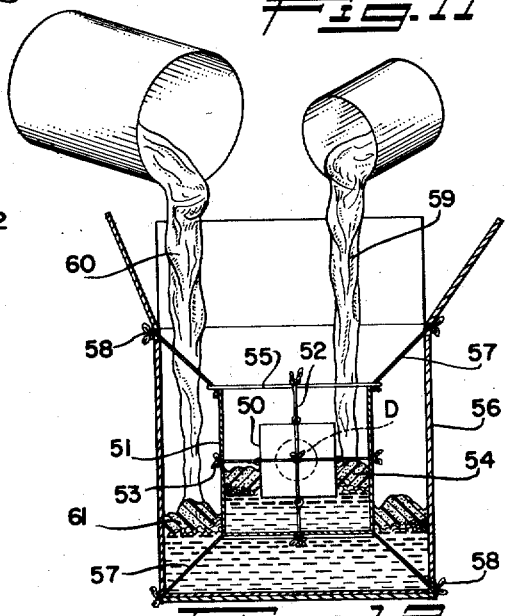
Figure 12 shows the assembly of Figure 11 positioned within an outer box or mold and illustrating the reactant mixtures being poured in the intermediate and outer containers for making the intermediate and outer protective cellular shells.

Figures 11 and 12 illustrate a package and packaging procedure of the invention characterized by the use of cords, rope, wire, or other flexible elements, to position the packaged object D in the inner cellular plastic sheath 54 and to position the inner sheath in the outer box or mold 56. The material or object D to be protected and packaged is shown contained within an innermost wrapping or box 50 and this box 50 is in turn substantially centrally positioned in an intermediate box 51. Flexible elements 52, such as strings, cords, ropes, or wires, are wrapped about or otherwise secured to the innermost box 50 and extend outwardly therefrom for attachment to the intermediate box 51. We have shown flexible elements 52 passing through openings in the walls of the box 51 and provided with knots 53, or the like, at the outer sides of the box 51 to support the object D and box 50 in the desired position within the intermediate box 51. The strings or flexible elements 52 are under tension to dependably support the box 50 in the selected position within the box 51, preparatory to and during pouring and rising of the inner sheath 54 of cellular plastic. The flexible elements 52 may extend from all six sides of the rectangular box 50 and the string or elements 52 extending from the upper side of the box 50 may be attached to a stick or rod 55 temporarliy arranged across the open upper end of the box 51. The six tensioned strings or elements 52 effectively hold the box 50 in place as the material for the sheath 54 is poured and as the cellular plastic material foams up around the box 50. The intermediate box 51 is secured and positioned in the outer mold or container 56 by similar flexible elements 57. We have shown the flexible elements 57 attached to the corners of the intermediate box 51 and extending diagonally outward for attachment to the corners of the outer box 56. The flexible elements 57 may pass through openings in the corners of the box 56 and have knots 58, or the like, for retaining them in place. The flexible elements 57 are under tension to hold the box 51 securely in the desired or central position within the box 56 preparatory to and during the pouring and rising of the cellular plastic material of the outer shell or sheath 61.

In Figure 12 we have shown the liquid or semi-liquid reactant mixtures 59 and 60 being poured in the open ends of the boxes 51 and 56 respectively, to react therein and rise up to form cellular plastic sheaths or shells 54 and 61 which completely encase the respective boxes 50 and 51. Sufficient quantities of the reactant mixtures are preferably introduced into the boxes 51 and 56 to provide cellular plastic sheaths 54 and 61 which completely fill their respective boxes to entirely enclose and protect the boxes 50 and 51. The cellular plastic sheaths 54 and 61 may be of similar or dissimilar physical characteristics, that is the similar or dissimilar reactant mixture such as above described may be used in making the poured-in-place protective sheaths 54 and 61. Any excessive cellular plastic that may rise from the tops or upper ends of the boxes 51 and 56 may be cut off. While we have shown the reactant mixtures 59 and 60 being simultaneously poured into the boxes 51 and 56, it is to be understood that the sheaths 54 and 61 may or may not be simultaneously poured in this manner. After the cellular plastic materials have set and hardened, the flexible elements 52 and 57 are completely embedded in the plastic and no longer support the boxes 50 and 51. In fact, the flexible elements do not transmit shock or impact loads inwardly to their respective boxes, being substantially incapable of transmitting end loads or compression loads. However, when the package is opened, the flexible elements 52 and 57 may assist in locating the intermediate box 51 and the innermost package or box 50 and may be useful in tearing or breaking away the cellular plastic material of the sheaths 54 and 61.

Figure 13:
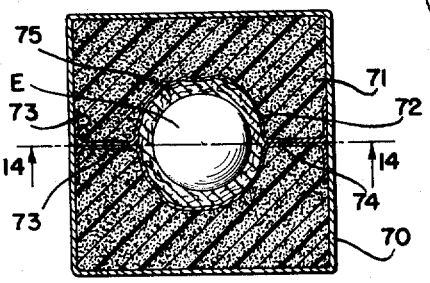
Figure 13 is a horizontal sectional view of still another package of the invention.
Figure 14:
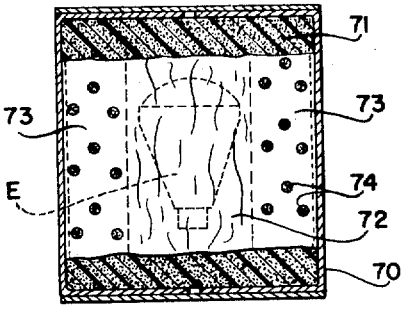
Figure 14 is a vertical sectional view taken as indicated by line 14—14 on Figure 13.

Figures 13 and 14 illustrate still another package of the invention. This structure has a container or box 70 which may correspond with the molds or boxes 13, 20, and 51 of the above described arrangements, and a shell or sheath 71 of a selected type of cellular or foamaceous plastic poured and foamed in place in the box. The mass or sheath 71 of cellular energy absorbing material encases and protects the packaged object E and may have the physical properties best adapted for the protection of the particular object. This form of the invention is characterized by a wrapping or bag 72 for the object E provided with ears, tabs, or wings 73 which may serve to position the object in the mold or box 70 for the pouring and rising of the cellular plastic sheath 71 and to assist in removing the plastic shell and in locating the object when the package is being opened. The wrapping or bag 72 may or may not contain a filling of ground foamed rubber, shredded paper, or other soft material 75 for directly supporting the object E. We have shown the wrapping or bag 72 constructed of two sheets of paper, cloth, or other sheet material, wrapped about the object E and having the tabs or wings 73 as edge continuations which are secured one to the other in face to face relation. These extensions or wings 73 extend outwardly from the bag 72 proper to the opposite inner walls of the box 70 where they are anchored by tacks, nails, adhesive tape, or the like. It is preferred to have the wings 73 occupy vertical planes so that the liquid reactant mixture may be readily poured or introduced into the box 70 to rise around the bag 72 at each side of each wing. If desired, the wings 73 may have perforations 74 so that the masses or bodies of the cellular plastic at the opposite sides of the wings are integrally joined or connected. The wings 73 may or may not extend the full length of the bag 72 depending upon the dimensions of the bag, the weight of the packaged object E, and like factors. It will be seen that the wings 73 serve to support and position the bag 72 and object E for the pouring and rising of the cellular plastic sheath 71. When the package is to be opened the cellular plastic of the sheath 71 may be cut, broken, or torn away at the wings 73 to reach the bag 72 and object E. The wings 73 may be pulled, manipulated, and delaminated to assist in removing the cellular plastic material of the sheath.

From the foregoing it will be apparent that we have provided simple, rapid and commercially practical procedures or methods for packaging and protecting objects of various natures, and have provided light-weight packages or arrangements which afford adequate protection for even the most fragile and shock sensitive objects and materials. The cellular plastic shells or sheaths of the invention are formed in situ, that is they are poured in place, the reactant mixtures rising or foaming up at atmospheric pressure and room temperatures, to constitute light-weight, adherent masses having the physical properties best suited to the particular packaging problem. The cellular plastic materials of the shells or sheaths are highly effective in absorbing energy and, therefore, protect the packaged object or material against impact, shock, vibration, etc. Furthermore, the cellular plastic materials of the sheaths are impervious to practically all fluids and, therefore, protect the packaged object or material against moisture, water, solvents, etc. The low or relatively low density of the cellular plastic protective sheaths make the packages buoyant so that the packages float in water and are, therefore, useful in ship to shore deliveries on the sea itself, airplane to water parachute drops, the preservation of important documents and materials in the event of shipwreck, etc. Although the packaged object and/or materials are entirely encased in the cellular plastic sheath or sheaths, the invention provides means for gaining ready access to them, thus greatly facilitating the opening of the packages.

Having described only typical forms of the invention we do not wish to be limited to the specific details herein set forth, but wish to reserve to ourselves any variations or modifications that may appear to those skilled in the art and fall within the scope of the following claims.

We claim:

1. Means for packaging an object comprising a first container, a mass of yielding resilient cellular plastic supporting the object in the first container in spaced relation to the walls thereof, a second container, and a mass of substantially rigid cellular plastic supporting the first container in the second container in spaced relation to the walls thereof.

2. Packaging means for an object comprising a sheet material covering around the object, a first container spaced around the covering, a fluid impervious mass of low density cellular plastic occupying the space between the covering and the container to completely enclose the object and its covering and form a fluid-tight sheath for the same, a second container spaced around the first container, and a second mass of fluid impervious low density cellular plastic occupying the space between the two containers to enclose the first container and thus support the same in the second container, one of said masses being of relatively unyielding plastic, the other mass being of yielding resilient plastic.

3. Packaging means for an object comprising a sheet material covering around the object, soft packing material supporting the object in the covering, a first container spaced around the covering, a fluid impervious mass of low density yielding cellular plastic occupying the space between the covering and the container to completely enclose the object and its covering, a second container spaced around the first container, and a second mass of fluid impervious low density relatively unyielding cellular plastic occupying the space between the two containers to enclose the first container and thus support the same in the second container.

*4. A package comprising a container having an article embedded therein by a sheath of low density, flexible, resilient, shock absorbing cellular polyurethane which maintains said article in cushioned and spaced relation to said container.*

*5. A package comprising a container having an article embedded therein by an integral sheath of low density, flexible, resilient, shock absorbing cellular polyurethane which maintains said article in cushioned and spaced relation to said container.*

*6. A package comprising: a container, a shock-absorbing cellular polyurethane sheath encased therein, a protective bag embedded within said sheath, and an article enclosed within said bag.*

*7. A package comprising: a container, a shock-absorbing cellular polyurethane sheath encased therein, a barrier embedded within said sheath, and an article positioned within said barrier, said shock-absorbing cellular polyurethane sheath placing said article in cushioned and spaced relation to said container.*

References Cited in the file of this patent or the original patent

UNITED STATES PATENTS

| | | |
|---|---|---|
| 1,457,496 | Butler | June 5, 1923 |
| 1,513,148 | Bartlett | Oct. 28, 1924 |
| 1,872,846 | Thiele | Aug. 23, 1932 |
| 1,888,152 | Worden | Nov. 15, 1932 |
| 1,982,319 | Perry | Nov. 27, 1934 |
| 1,983,322 | Stewart | Dec. 4, 1934 |
| 2,282,908 | Thompson | May 12, 1942 |
| 2,290,614 | Rathbun | July 21, 1942 |
| 2,354,433 | Carter | July 25, 1944 |
| 2,376,653 | Boyer | May 22, 1945 |
| 2,409,910 | Stober | Oct. 22, 1946 |
| 2,414,525 | Hill et al. | Jan. 21, 1947 |
| 2,438,089 | Carson | Mar. 16, 1948 |
| 2,459,400 | Williams | Jan. 18, 1949 |
| 2,516,124 | Kishibay | July 25, 1950 |
| 2,549,050 | Brophy et al. | Apr. 17, 1951 |
| 2,551,374 | Hansen | May 1, 1951 |
| 2,577,279 | Simon | Dec. 4, 1951 |
| 2,579,036 | Edelman | Dec. 18, 1951 |

FOREIGN PATENTS

| | | |
|---|---|---|
| 19,422 | Great Britain | 1903 |
| 225,154 | Great Britain | Nov. 27, 1924 |
| 637,630 | Great Britain | May 24, 1950 |

OTHER REFERENCES

German Plastics Practice, published by De Bell & Richardson, 1946, pages 455–463. (Copy found in Div. 50.)

Expanding Fields for Expanded Plastics, Scientific American, September 1947. (Copy found in 206—46 Fragile.)

Princeton Introduces Novel Polyurethane Made From Castor Oil and Diisocyanate, Chemical Engineering, April 1950. (Copy in Div. 50.)